US011193472B2

(12) United States Patent
Messing et al.

(10) Patent No.: US 11,193,472 B2
(45) Date of Patent: Dec. 7, 2021

(54) OPERATION OF A WIND POWER PLANT DURING A STORM

(71) Applicant: Wobben Properties GmbH, Aurich (DE)

(72) Inventors: Ralf Messing, Aurich (DE); Mustafa Onur Kimilli, Munich (DE); Daniel Senftleben, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/959,321

(22) PCT Filed: Dec. 11, 2018

(86) PCT No.: PCT/EP2018/084343
§ 371 (c)(1),
(2) Date: Jun. 30, 2020

(87) PCT Pub. No.: WO2019/134793
PCT Pub. Date: Jul. 11, 2019

(65) Prior Publication Data
US 2021/0017957 A1 Jan. 21, 2021

(30) Foreign Application Priority Data
Jan. 4, 2018 (DE) .................... 10 2018 100 127.4

(51) Int. Cl.
*F03D 7/00* (2006.01)
*F03D 7/02* (2006.01)

(52) U.S. Cl.
CPC .......... *F03D 7/0276* (2013.01); *F03D 7/0268* (2013.01); *F05B 2270/1033* (2013.01); *F05B 2270/32* (2013.01)

(58) Field of Classification Search
CPC .... F03D 7/0224; F03D 7/0276; F03D 7/0268; F05B 2260/76; F05B 2270/1033;
(Continued)

(56) References Cited

U.S. PATENT DOCUMENTS 7,629,702 B2 * 12/2009 Schubert ................. F03D 7/042
290/44
10,027,266 B2 7/2018 Beekmann et al.
(Continued)

FOREIGN PATENT DOCUMENTS

DE 19532409 A1 3/1997
DE 102011006670 A1 10/2012
(Continued)

*Primary Examiner* — Julio C. Gonzalez
(74) *Attorney, Agent, or Firm* — Seed IP Law Group LLP

(57) ABSTRACT

A method of controlling a wind power plant for generating electrical power from wind is provided. The plant comprises a rotor having rotor blades with adjustable blade angles and the rotor can be operated at a variable rotational speed. The method includes controlling the plant in a partial load mode when wind speed is below a nominal speed and, controlling the plant in a storm mode when the wind speed is above a storm commencement speed. An output power of the plant in the partial load mode and storm mode is adjusted according to an operating characteristic curve that determines a relationship between the rotational speed and the output power. A partial load characteristic curve is used as the operating characteristic curve for controlling the power plant in partial load mode, and a storm mode characteristic curve is used as the operating characteristic curve for controlling the plant in storm mode.

19 Claims, 7 Drawing Sheets

(58) Field of Classification Search
CPC ............ F05B 2270/32; F05B 2270/327; F05B 2270/328; F05B 2270/3201; Y02E 10/72
See application file for complete search history.

(56) References Cited

U.S. PATENT DOCUMENTS

| | | |
|---|---|---|
| 2014/0084587 A1* | 3/2014 | Beekmann ............ F03D 7/0276 290/44 |
| 2018/0051675 A1* | 2/2018 | Kjær ..................... F03D 7/0224 |
| 2018/0328339 A1 | 11/2018 | Altmikus et al. |
| 2019/0113020 A1 | 4/2019 | Messing et al. |

FOREIGN PATENT DOCUMENTS

| | | |
|---|---|---|
| EP | 1988284 A1 | 11/2008 |
| EP | 2063111 A2 | 5/2009 |
| NZ | 316943 A | 11/1998 |
| WO | 2017085156 A1 | 5/2017 |
| WO | 2017178429 A1 | 10/2017 |

* cited by examiner

OPERATION OF A WIND POWER PLANT DURING A STORM

BACKGROUND

Technical Field

The present invention relates to a method of controlling a wind power plant and the present invention relates to a corresponding wind power plant.

Description of the Related Art

Wind power plants are sometimes operated even during a storm, which means at wind speeds above 20 meters per second (m/s). One variant of doing this is to operate the wind power plant with the aid of an operating characteristic curve, which specifies the relationship between the output power and the rotor speed, and a wind speed/rotational speed characteristic curve. The wind power plant is controlled thereby in such a way that a rotational speed at which the wind power plant is operated at the measured wind speed is specified on the basis of the wind speed measured at the wind power plant and the wind speed/rotational speed characteristic curve. This predetermined rotational speed is regulated by adjusting the blade angle of the rotor blades of the wind power plant, which is also referred to as 'pitching' the rotor blades.

The operating characteristic curve then tells the wind power plant which output power to feed into the electrical supply grid, which is also referred to simply as the 'power grid'. The output power of the wind power plant is thus specified according to the rotational speed by means of the operating characteristic curve and is then adjusted accordingly. FIGS. 2 and 3 show the aforementioned characteristic curves of the storm control system, FIG. 2 shows the wind speed/rotational speed characteristic curve, and FIG. 3 shows the aforementioned operating characteristic curve, that is, the characteristic curve specifying the dependence of output power on rotational speed.

FIG. 2, in particular, shows that, until the storm control system kicks in at wind speed $V_{SA}$, the wind power plant is thus operated at the constant nominal speed $N_{set}$, at which the wind power plant outputs the maximum power, namely the nominal power, as the output power, and thus feeds it into the electrical supply grid. The storm control mode commences from wind speed $V_{SA}$, which can also be referred to as the storm commencement wind speed, wherein the rotational speed is reduced linearly from the nominal speed $N_{set}$ to an idle speed $N_t$ at a wind speed of $V_{max}$, in order to keep the loads on the wind power plant within specified limits. Wind speed $V_{max}$ can also be referred to as the maximum wind speed or as the maximum storm wind speed.

From this maximum wind speed $V_{max}$, the wind power plant runs in idle mode only and no longer feeds any power into the grid. For that to happen, however, the wind speed must exceed the maximum wind speed $V_{max}$ on a 12-second average.

Characteristic values for the storm commencement wind speed $V_{SA}$ and the maximum wind speed $V_{max}$ vary between the different types of wind power plant. The storm commencement wind speed ranges between 25 and 29 m/s, and the maximum wind speed or maximum storm wind speed $V_{max}$ ranges between 37 and 41 m/s.

The operating characteristic curve in storm mode, as shown in FIG. 3, is identical in the prior art to an operating characteristic curve in normal operating mode or in partial load mode. It is reduced from the nominal speed $N_{set}$ at nominal power $P_{max}$ to the idle speed $N_t$ at minimum power $P_{min}=0$ kW. In the operating characteristic curve shown in FIG. 3, no distinction is made between different reasons why the rotational speed is less than the nominal speed $N_{set}$.

By pitching the rotor blades as described, less power, in particular less than the nominal power, is extracted from the wind. In terms of energy, it basically does not matter why less than nominal power is available, i.e., whether this is due to the rotor blades being pitched during a storm, or because the wind has dropped. The same operating characteristic curve, i.e., the same speed/power characteristic curve as shown in FIG. 3, can therefore be used in partial load mode, i.e., when the wind has not yet reached its nominal speed and it is not yet possible to generate the nominal power, and also in storm mode.

A load may nevertheless be high in storm mode, because in addition to the energy aspect it is also necessary to take into account the forces acting on the rotor blades.

To counteract such forces, a further reduction in speed or power or both may be made in storm mode. However, this does not necessarily reduce the load, particularly since the wind power plant is still in the wind, or in this case in the storm. There is also the disadvantage of a drop in power, but this has to be accepted in order to protect the wind power plant.

The German Patent and Trademark Office searched the following prior art in connection with the priority application for the present PCT application: EP 2 063 111 A2, WO 2017/085156 A1 and WO 2017/178429 A1.

BRIEF SUMMARY

Provided one or more techniques that results, in the event of a storm, in the wind power plant being subjected to minimal load and/or in the drop in power being minimized. A storm control system is provided.

A method is provided. This method is based on a wind power plant for generating electrical power from the wind. Such a wind power plant comprises a rotor having at least one rotor blade, in particular a plurality of rotor blades, which are adjustable in respect of the blade angle thereof. The method thus relates to a 'pitch-controlled' wind power plant. The wind power plant is also one in which the rotor can be operated at a variable rotational speed.

According to the proposed method, the wind power plant is controlled in a partial load mode when the wind has a wind speed below a nominal wind speed. The wind power plant is controlled in a storm mode when the wind has a wind speed above a storm commencement wind speed. In both partial load mode and in storm mode, an output power to be output by the wind power plant is adjusted according to an operating characteristic curve. In both cases, the operating characteristic curve describes a relationship between the rotational speed and the output power, and the operating characteristic curve specifies the output power according to the rotational speed, and specifies the relationship between those two variables.

A partial load characteristic curve is used as the operating characteristic curve for controlling the wind power plant in partial load mode. A storm mode characteristic curve storm is used as the operating characteristic curve for controlling the wind power plant in storm mode, and these two operating characteristic curves, i.e., the partial load characteristic curve and the storm mode characteristic curve, are different.

It is proposed in this regard that the storm mode characteristic curve, in comparison with the partial load characteristic curve, has lower rotational speed values for the same power values, at least in sections.

Reducing the rotational speed in storm mode for the same power values, in comparison with partial load mode, is by no means a trivial measure for reducing load, as this measure also means that higher power values are set for the same rotational speed values, which can basically result in an increase in load. However, it was realized that such a modified relationship also provides aerodynamic advantages, especially.

It should also be noted that in storm mode the rotational speed is set according to the wind speed, and only then is a power output set on the basis of the set rotational speed.

However, it was realized that the aerodynamic conditions, especially, are so different in storm mode, in comparison with partial load mode, that it is advantageous in storm mode to have lower rotational speed values for the same power values.

In particular, therefore, it is also proposed that the storm mode characteristic curve, in comparison with the partial load characteristic curve, has lower rotational speed values for the same power values (P) over its entire range. Such a general statement does not arise by any means automatically from a desire to reduce a load in storm mode. Rather, a person skilled in the art cannot expect any advantage from such a change in the rotational speed/power characteristic curve without a more exact analysis of the relationships, which shall also be done in detail below. To achieve a load reduction in storm mode, it would be obvious, instead, to further reduce the rotational speed and the power output in response to high wind speeds, if it appears that previous reductions are not sufficient to limit the load.

In addition or as an alternative to using a storm mode characteristic curve and a partial load characteristic curve that differ, it is proposed that a wind speed/rotational speed characteristic curve specifies a reduction in the rotational speed with increasing wind speed from the storm commencement wind speed, wherein a degree of reduction in the rotational speed increases with increasing wind speed. The rotational speed is thus reduced faster and faster with increasing wind speed, which means that a negative rotor speed gradient increases in magnitude with increasing wind speed, and thus that the rotor speed gradient decreases. In this way, the rotational speed can be reduced more slowly to begin with.

It was realized, furthermore, that a problem also arises because of expected stalling of the rotor blades. It is therefore proposed that the storm commencement wind speed is preferably selected according to an expected stalling of the rotor blades. Such stalling, especially, can be a major stress factor for the respective rotor blade and thus for the rotor and the wind power plant. Such stalling can also occur on the pressure side of the rotor blade profile. It should also be noted with regard to such stalling that its occurrence can depend not only on the wind speed, but also on the blade angle and the rotor speed, or on the swept speed at the respective profile section. In particular, it should be noted here that such stalling does not occur simultaneously along the entire blade, but can also occur only locally, especially in the outer region of the rotor. In this case, there are regions of the rotor blade where stalling may occur and other regions where no stalling is to be expected. This can cause particularly unwelcome differences in load along the rotor blade.

For that reason, it is proposed that any stalling to be expected is taken into account. It should be noted in this regard that such characteristics of rotor blades can be well researched in simulations or also in model tests and for that reason are also predictable. Such studies or preliminary tests based on operating modes can also allow statements to be made about whether, where to what extent stalling is to be expected. Wind speed, rotational speed and blade angle, in particular, allow estimates to be made for respective sections of the rotor blade as to whether stalling is to be expected.

According to one embodiment, it is proposed that the storm commencement wind speed is selected according to a power coefficient of the rotor blades. It was realized that the aerodynamic conditions, especially, are important for the storm mode and that a criterion can thus be created by looking at the power coefficients. It was discovered in this regard that the power coefficient decreases with increasing wind speed during full load mode, also due to pitching in such full load mode. As storm mode is approached, the power coefficient decreases continuously, therefore, and can then be used to indicate when storm mode has been reached. By specifying a threshold for the power coefficient, it is then possible to specify a clear criterion that takes aerodynamics into account and by means of which the start of storm mode can be detected.

The wind power plant is designed in such a way and is controlled in such a way that the power coefficient decreases with increasing wind speed at least from the nominal wind speed, i.e., when full load mode is reached. It is also proposed in this regard that the wind speed at which the power coefficient falls below a predefined storm threshold for the power coefficient be selected as the storm commencement wind speed. A test can be carried out beforehand here, and a wind-speed dependent power coefficient can be measured. This also takes into account the respective operating point and thus the pitching of the rotor blades, and such a specification can thus be made in advance. On the basis of the power coefficient, in particular the power coefficient under consideration here that decreases with increasing wind speed, it is also possible to determine when and where stalling can be expected. For this reason, the power coefficient and especially a suitably predefined storm threshold is proposed as criterion.

According to one embodiment, it is proposed that the storm mode characteristic curve forms a linear storm mode characteristic curve which decreases linearly with increasing wind speed from a predefined storm commencement power value at a predefined storm commencement rotational speed to a final storm power value at a predefined final storm rotational speed. A storm mode characteristic curve is thus proposed here that declines linearly, namely linearly as a function of wind speed. This allows the rotational speed to be reduced by an appropriate amount in relation to the wind speed, and this reduction can also specify, in a simple and practically implementable manner, an increase in rotational speed when the wind speed drops again.

It is proposed, alternatively, that the storm mode characteristic curve decreases initially, with increasing wind speed, from the predefined storm commencement power value at the predefined storm commencement rotational speed to a storm auxiliary power coefficient (value) at a predefined storm auxiliary rotational speed and from there to the final storm power value at the predefined final storm rotational speed, wherein the storm auxiliary power value at the predefined storm auxiliary rotational speed lies below a/the linear operating characteristic curve. This means that the storm mode characteristic curve is flatter from the storm auxiliary rotational speed to the final storm rotational speed than from the storm commencement rotational speed to the storm auxiliary rotational speed. In this way, the reduction in power can be carried out quickly at first, especially at the beginning of the storm.

It is proposed that the wind speed is preferably measured and that, in storm mode from the storm commencement wind speed, the rotor blades are adjusted in respect of their blade angle according to the wind speed, such that a lower rotational speed is reached. It is then proposed in this regard that the output power is set in accordance with the storm mode characteristic curve depending on the rotational speed that is reached. A two-step procedure is thus proposed, in which the blade angle of the rotor blades is firstly adjusted, namely in such a way that they are turned out of the wind with increasing wind speed. This results in less power being extracted from the wind, thus resulting in a lower rotational speed. This resultant lower rotational speed is then used in the next step to adjust the output power. The output power is set according to the storm mode characteristic curve. This allows an immediate reduction of load by firstly adjusting the rotor blades, after which the output power can then be adjusted.

The proposed storm mode characteristic curve, which has lower speed values compared to the partial load characteristic curve for the same power values, is particularly advantageous in this regard. This means that the power in this second step is accordingly reduced less strongly than would be the case if the partial load characteristic curve were used. It is specifically proposed in this regard that the reduction in rotor speed be adjusted by setting the blade angle of the rotor blades in accordance with the advantageous storm mode characteristic curve.

According to one embodiment, it is proposed that, in storm mode from the storm commencement wind speed, the rotor blades are adjusted in respect of their blade angle such that a rotational speed according to a predefined wind speed/rotational speed characteristic curve results. This measure can thus be used to specify a wind speed/rotational speed characteristic curve. The rotational speed, in particular, which is dependent on the wind speed, has immediate effects on the aerodynamic forces acting on the rotor blade. Especially when the blade angle and of course the known geometry of the rotor blade are also taken into account, it is possible here to take stall effects into account. In particular, such stall effects can be detected in advance and it is further preferred and proposed, in light of such findings, that an appropriate wind speed/rotational speed characteristic curve be selected in which undesirable stalling does not occur or can at least be reduced.

According to one embodiment, it is proposed that the wind speed/rotational speed characteristic curve forms a linear wind speed/rotational speed characteristic curve which decreases linearly with increasing wind speed from the predefined storm commencement rotational speed at the predefined storm commencement wind speed to the predefined final storm rotational speed at a predefined final storm wind speed. A linear wind speed/rotational speed characteristic curve is thus proposed in which the rotational speed decreases linearly with increasing wind speed, i.e., it is reduced proportionally to an increase in wind speed. A clear relationship between wind speed and rotational speed can thus be established, which can also be implemented by the wind power plant or its control system. By means of such a linear wind speed/rotational speed characteristic curve, it is also possible to increase the rotational speed again when the wind speed drops. It is particularly preferred that the nominal speed is used as the storm commencement rotational speed. This means that, immediately after full load mode, the rotational speed can simply be reduced linearly with increasing wind speed by means of the proposed linear wind speed/rotational speed characteristic curve.

It is particularly preferred that such a linear wind speed/rotational speed characteristic curve be combined with a linear rotational speed/power curve. This allows a linear relationship to be established between the output power and the wind speed. In the event of a storm, the rotational speed and the output power can thus be reduced simultaneously and linearly with increasing wind speed, thus allowing the respective loads to also be reduced or limited simultaneously. A reduction in rotational speed affects the mechanical loads on the rotor blades, especially, whereas a reduction in output power is more likely to affect loads on the drivetrain. By linearly reducing both the rotational speed and the power output in the manner proposed, a reduction for both areas can thus be carried out in equal measure and in a verifiable manner.

It is proposed, alternatively, that the wind speed/rotational speed characteristic curve decreases initially with increasing wind speed from the predefined storm commencement rotational speed, namely preferably from the nominal speed, at a higher storm commencement wind speed that is greater than the predefined storm commencement wind speed, i.e., than the unincreased storm commencement wind speed, to an intermediate storm rotational speed at a predefined intermediate storm wind speed. The intermediate storm rotational speed is preferably equal to the storm auxiliary rotational speed in the storm mode characteristic curve. It is proposed, in any case, that the intermediate storm rotational speed be further reduced at the predefined intermediate storm wind speed to the final storm rotational speed at the predefined final storm wind speed, wherein it is preferable that the intermediate storm rotational speed at the predefined intermediate storm wind speed intermediate storm wind speed is above the linear wind speed/rotational speed characteristic curve.

This wind speed/rotational speed characteristic curve preferably begins at a higher storm commencement wind speed. In relation to an increasing wind speed, it thus begins later than the predefined storm commencement wind speed. A power reduction that does not commence until later can thus be achieved. This preferred wind speed/rotational speed characteristic curve will preferably have a flatter gradient whatever the case, i.e., regardless of whether the storm commencement wind speed is higher or not higher, than later on, i.e., it has a smaller gradient at lower wind speeds than at higher wind speeds.

What was realized here, in particular, was that pitching too early on or too much can result in negative angles of attack especially in the outer region of the rotor blade, i.e., towards the tip region. Such negative angles of attack can then lead to stalling effects, also and especially on the pressure side of the rotor blades. However, as these negative angles of attack do not occur along the entire blade, i.e., from the root area to the tip, but especially in the outer region, stalling also occurs only there, in particular. This results in different loads in the outer and inner area of the rotor blade, which can also lead to rotor blade torsion. Such torsion can amplify or soften the effect, which in turn can result in torsional vibration. Such different loads, especially the torsional vibrations mentioned above, can expose the rotor blade to a high level of stress. The proposed measures are aimed at counteracting precisely that. In particular, by preventing the blade angle from being adjusted too early, in such a way that the rotational speed is also reduced, it is possible to prevent such negative angles of attack in a part of the rotor blade.

According to one embodiment, the wind speed/rotational speed characteristic curve specifies a reduction in the rotational speed with increasing wind speed from the storm commencement wind speed, wherein a degree of reduction in the rotational speed increases with increasing wind speed. Thus, in the event of a storm, the speed of rotation is reduced with increasing wind speed, in the manner that basically is also generally known. In that regard, however, it is now proposed in addition that this reduction also intensifies progressively with increasing wind speed. In other words, the rotational speed drops more and more steeply. This results in a wind speed/rotational speed characteristic curve that is arched upwards. This can be done in portions, in the simplest case by applying an initial reduction gradient until an intermediate storm wind speed, and then applying a stronger reduction, i.e., the degree of reduction is increased. However, it can also be done in several steps, or it can also preferably be done continuously, so that the wind speed/rotational speed characteristic curve forms a continuous characteristic curve that arches upwards.

This can also prevent the rotational speed from being reduced too quickly too early, which surprisingly would not necessarily result in the wind power plant being relieved of stress, but may even be unfavorable, particularly with regard to loads caused directly by aerodynamic factors, due to the aerodynamic stress already described in the foregoing, in particular the risk of torsional vibrations. Thus, by means of this wind speed/rotational speed characteristic curve with intensifying reduction of rotational speed, an advantageously weaker reduction of rotational speed at the beginning is achieved.

According to another embodiment, it is proposed that, with increasing wind speed, the rotor blade angle is increased according to the wind speed towards a feathered position such that the blade angle increases in order to reduce the rotational speed. It is assumed here, in particular, that the blade angle is defined in such a way that the feathered position is approximately equal to a blade angle of 90° (and not 0°), is a common definition of the blade angle that can also be referred to as the pitch angle. An adjustment towards the feathered position therefore entails an increase in the blade angle.

Depending on the reduction in rotational speed, the output power is then reduced. What happens first, in other words, is a reduction in rotational speed that is dependent on the wind speed, and this reduction then forms the basis for reducing the output power, as has also been described already in the foregoing.

It was now realized that the ratio of the increase in angle to the reduction in output power forms an angle/power change coefficient. The angle/power change coefficient $C_{WP}$ can thus be defined as the ratio of the angle increase $\Delta W$ proposed for a specific increase in wind speed to the reduction in output power $\Delta P$ proposed for the resultant change in rotational speed, i.e., as $C_{WP}=\Delta A/\Delta P$. It is proposed, with regard to this angle/power change coefficient, that it increases in magnitude with increasing wind speed. This can be used to specify an advantageous behavior of the wind power plant in the event of a storm, because the proposed increase in the angle/power change coefficient also results from the corresponding change in the output power. More specifically, it is proposed here that, with increasing wind speed, the output power is initially adjusted more quickly in comparison with the blade angle, and then more slowly. In this way, it is possible to prevent the blade angle and the rotational speed from being adjusted too quickly, thus resulting in the aerodynamic problems mentioned above, while at the same time the output power and the associated loads can reduced quickly right from the start.

To that end, it is proposed that the angle/power change coefficient preferably decreases from a predetermined first reversal wind speed in storm mode and in particular increases again from a second reversal wind speed that is greater than the first reversal wind speed. It was realized in this regard that at a high wind speed in storm mode, which is specifically in the range between 25 and 26 m/s, increasing the angle too quickly may result in a negative angle of attack, in particular in a strongly negative angle of attack. To prevent that from happening, the angle/power change coefficient is reduced in this case from the first reversal wind speed, which means that the angle is then reduced less quickly from that point. From the second reversal wind speed, the power and/or the rotational speed may have dropped sufficiently so that the angle can be reduced more quickly again.

A wind power plant is also proposed. Such a wind power plant is provided in order to generate electrical power from the wind and comprises a rotor having rotor blades which are adjustable in respect of the blade angle, wherein the rotor can be operated at a variable rotational speed. The wind power plant comprises:

a control unit (e.g., controller) for controlling the wind power plant in a partial load mode when the wind has a wind speed below a nominal wind speed, and for controlling the wind power plant in a storm mode when the wind has a wind speed above a storm commencement wind speed, wherein the control means (e.g., controller) is configured to control the wind power plant in such a way that an output power to be output by the wind power plant in partial load mode and in storm mode is adjusted according to an operating characteristic curve, wherein the operating characteristic curve determines a relationship between the rotational speed and the output power, a partial load characteristic curve is used as the operating characteristic curve for controlling the wind power plant in partial load mode, and a storm mode characteristic curve is used as the operating characteristic curve for controlling the wind power plant in storm mode, and wherein the storm mode characteristic curve and the partial load characteristic curve are different and the storm mode characteristic curve, in comparison with the partial load characteristic curve, has lower rotational speeds for the same power values, at least in sections, and/or the control means is configured to specify a wind speed/rotational speed characteristic curve which specifies a reduction in the rotational speed with increasing wind speed from the storm commencement wind speed, wherein a degree of reduction in the rotational speed increases with increasing wind speed, i.e., a negative rotor speed gradient increases in magnitude with increasing wind speed, so the rotor speed gradient decreases.

Such a wind power plant is also configured, in particular, to perform a method as described in the foregoing, and described according to one embodiment, at least. A control unit is provided for that purpose, which may also be in the form of a process control computer on which the functions are implemented and which can transmit the corresponding control commands to control elements (controllers) of rotor blades, excitation actuators, or also frequency inverters provided for feeding power into an electrical power grid.

Such a wind power plant preferably has at least one wind speed sensor. This wind speed sensor is used in storm mode, in particular, in which it then detects the wind speed and, depending on the latter, the wind power plant is controlled, in particular with regard to its rotational speed. A plurality of different wind speed sensors are preferably provided for redundancy purposes and/or to increase measurement accuracy.

According to one embodiment at least, the control unit is provided so that characteristic curves are stored in it. It is proposed, in particular, that a partial load characteristic curve and a storm mode characteristic curve are stored in the control unit, and preferably also a wind speed/rotational speed characteristic curve, in particular for the storm mode. Based on that, i.e., using one or more of these characteristic curves, the control unit and thus the wind power plant can perform at least one method as described above with reference to at least of the embodiments of the method.

BRIEF DESCRIPTION OF THE SEVERAL VIEWS OF THE DRAWINGS

Exemplary embodiments of the invention shall now be described in greater detail with reference to the accompanying Figures, in which.

DETAILED DESCRIPTION

Figure 1:
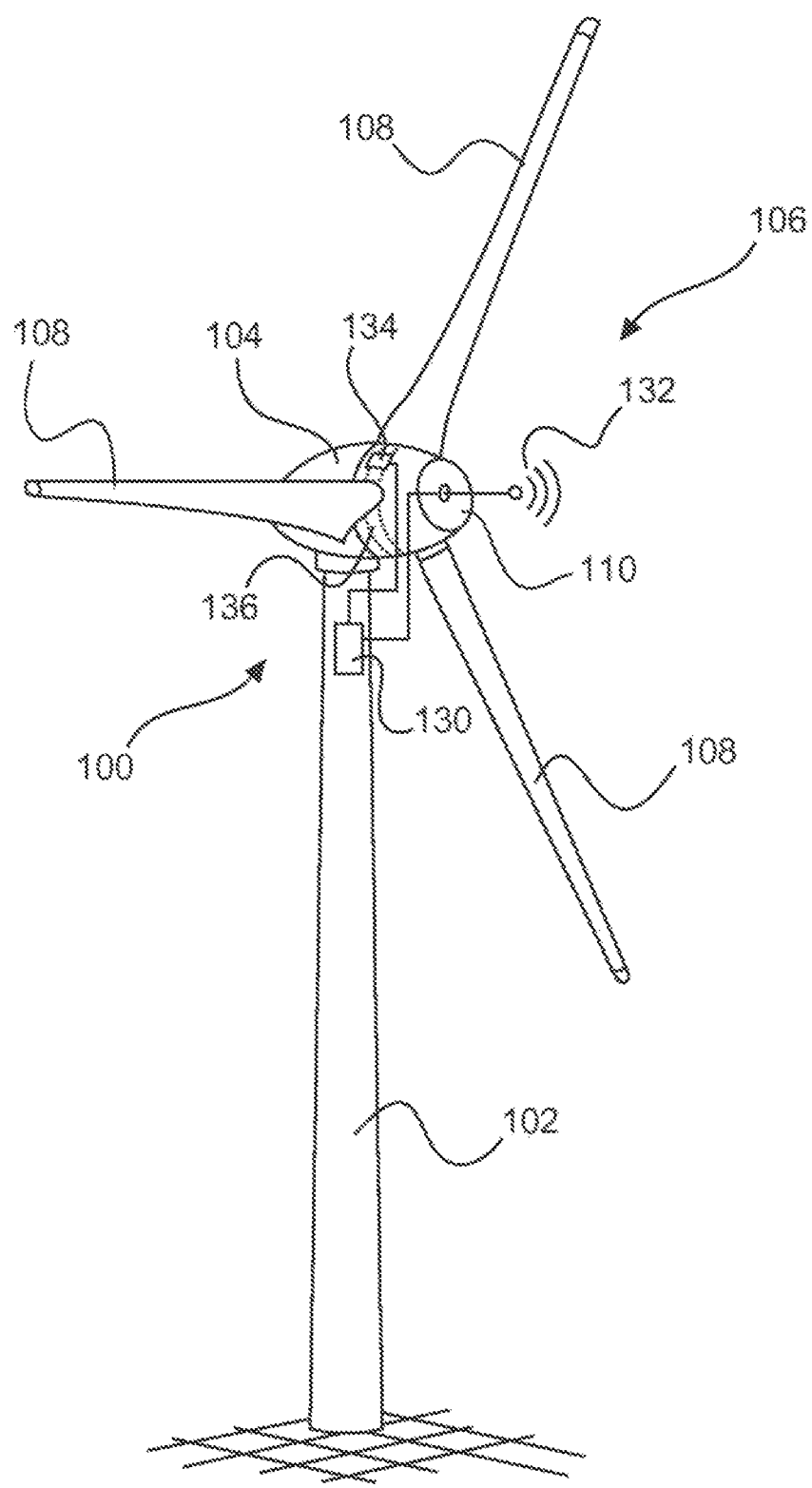
FIG. 1 shows a perspective view of a wind turbine.

FIG. 1 shows a wind turbine 100 comprising a tower 102 and a nacelle 104. A rotor 106 having three rotor blades 108 and a spinner 110 is arranged on nacelle 104. Rotor 106 is made to rotate by the wind and drives a generator in nacelle 104 as a result.

FIG. 1 also illustrates a control unit (e.g., controller) 130 that can control wind power plant 100. A wind speed sensor 132 (e.g., anemometer), which may be arranged on spinner 110, is provided for controlling wind power plant 100 according to the wind speed. It sends its signals to control unit 130. Control unit 130 can analyze these signals and thus control a pitch motor 134, for example, which is only shown as an illustration in FIG. 1. Only one pitch motor 134 is shown, although of course each of rotor blades 108 may have a pitch motor 134, by means of which its blade angle can be adjusted. A generator 136 is likewise indicated in FIG. 1 and can be controlled by control unit 130 to adjust the output power, if necessary.

Figure 2:
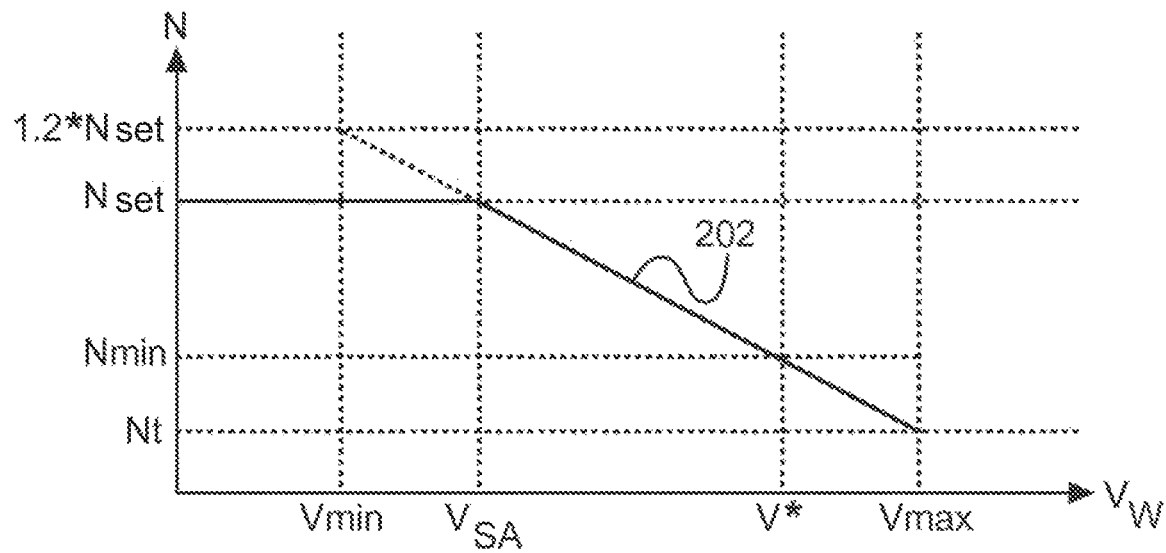
FIG. 2 shows an illustrative wind speed/rotational speed characteristic curve for the storm mode range.

FIG. 2 shows a simple variant of wind speed/rotational speed characteristic curve 202. This curve shows the nominal speed $N_{set}$ at wind speeds below a minimum wind speed $V_{min}$. The range up to this minimum wind speed forms the full-load range or full load mode of the wind power plant, in any case as long as the wind speed is not less than a nominal wind speed, which is not shown in FIG. 2, because the latter substantially shows only the wind speed/rotational speed characteristic curve for the storm mode. Nor are any wind speed/rotational speed characteristic curves provided for other ranges. There are known relationships between wind speed and rotational speed, but these are not normally used to control the system in full load mode and partial load mode. Only for storm mode is it proposed that the rotational speed be set as a function of the measured wind speed, in accordance with wind speed/rotational speed characteristic curve 202.

In the example shown in FIG. 2, storm mode commences when the storm wind speed, referred to as $V_{SA}$, is reached. From then on, the rotational speed decreases linearly in accordance with the wind speed/rotational speed characteristic curve 202 until the maximum wind speed $V_{max}$ is reached, at which point it equals the idle speed $N_t$. There is also an exception where the wind power plant can be shut down at the safety wind speed V* when the wind speed exceeds the safety wind speed V* on a 10-minute average.

Wind speed/rotational speed characteristic curve 202 drops linearly here and its linear drop can also be defined on the basis of a virtual starting value, which is plotted at the minimum wind speed and 1.2 times the nominal speed.

Figure 3:
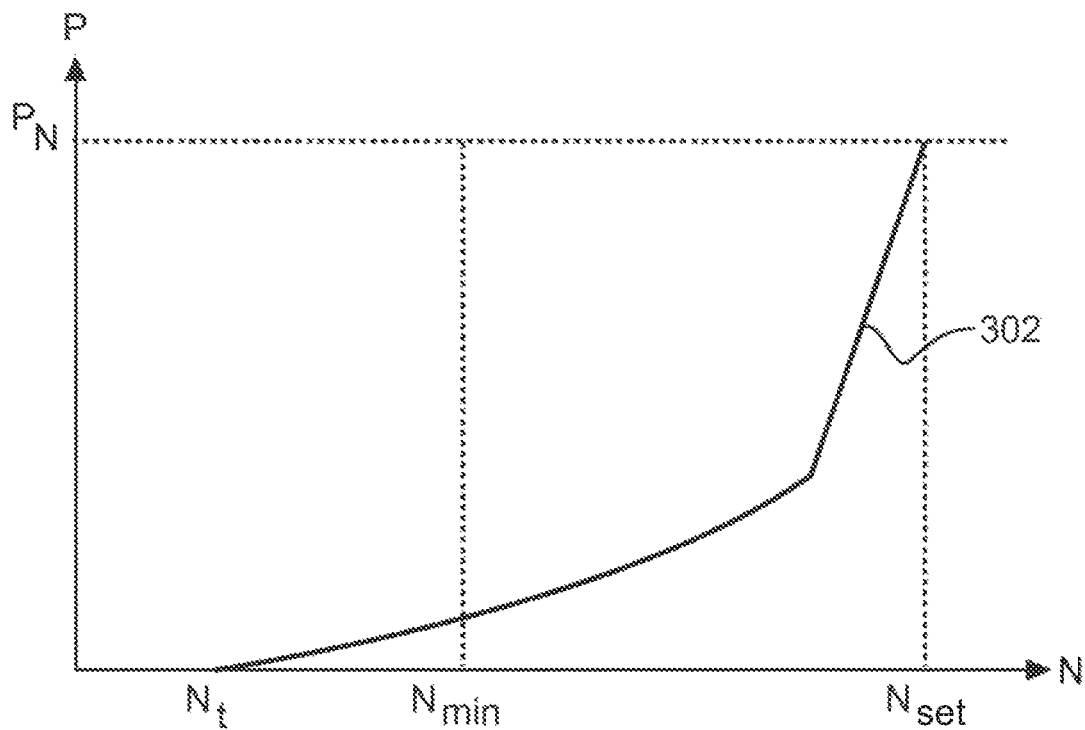
FIG. 3 shows a rotational speed/power characteristic curve and thus an operating characteristic curve.

FIG. 3 shows a rotational speed/power characteristic curve and thus an operating characteristic curve 302, which can also be abbreviated to BKI. This curve shows a relationship between rotational speed N and power P. At what is basically the maximum rotational speed, namely the nominal rotational speed $N_{set}$, the nominal power $P_N$ is also available. At correspondingly lower rotational speeds, the power is also lower and drop to the value zero at idle speed $N_t$. In this case, the system is operated at the idle speed without generating any power. This operating characteristic curve 302 in FIG. 3 can show or specify the relationship between rotational speed N and power P not only in partial load mode but also in storm mode. In partial load mode, however, the rotational speed would increase with increasing wind speed, whereas in storm mode the rotational speed decreases with increasing wind speed. Viewed in that way, the operating characteristic curve would apply in the reverse direction in storm mode, in relation to the wind speed.

Note should also be taken of the following points. During a storm, the air flowing through the swept area of the rotor has very high kinetic energy, and only a small part of it needs to be converted by the wind power plant into rotational energy in order to generate the required power according to the operating characteristic curve.

It was realized that the torque necessary to achieve that is substantially generated only in the inner region of the blade, with the result that the distribution of the angle of attack over the radius of the rotor differs fundamentally from the distribution in normal operating mode.

Figure 4:
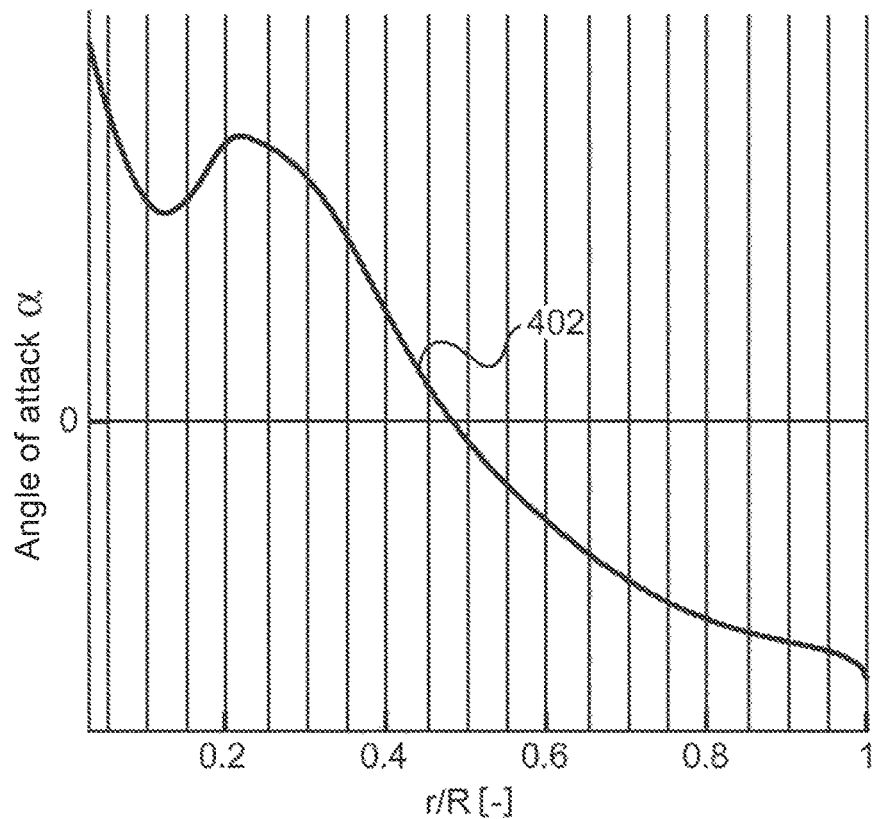
FIG. 4 shows an example of how the angle of attack changes in storm mode along a rotor blade from the blade root to the blade tip, as a function of the radius.

To illustrate this, FIG. 4 shows a typical curve for the angle of attack at a wind speed in storm mode. In this regard, the angle of attack is to be understood as the angle at which air actually flows in relation to the chord of the rotor blade in the section in question. This angle of attack thus depends on the actual position of the rotor blade, the prevailing wind at that point and the rotational speed of the rotor blade at that point.

Figure 10:
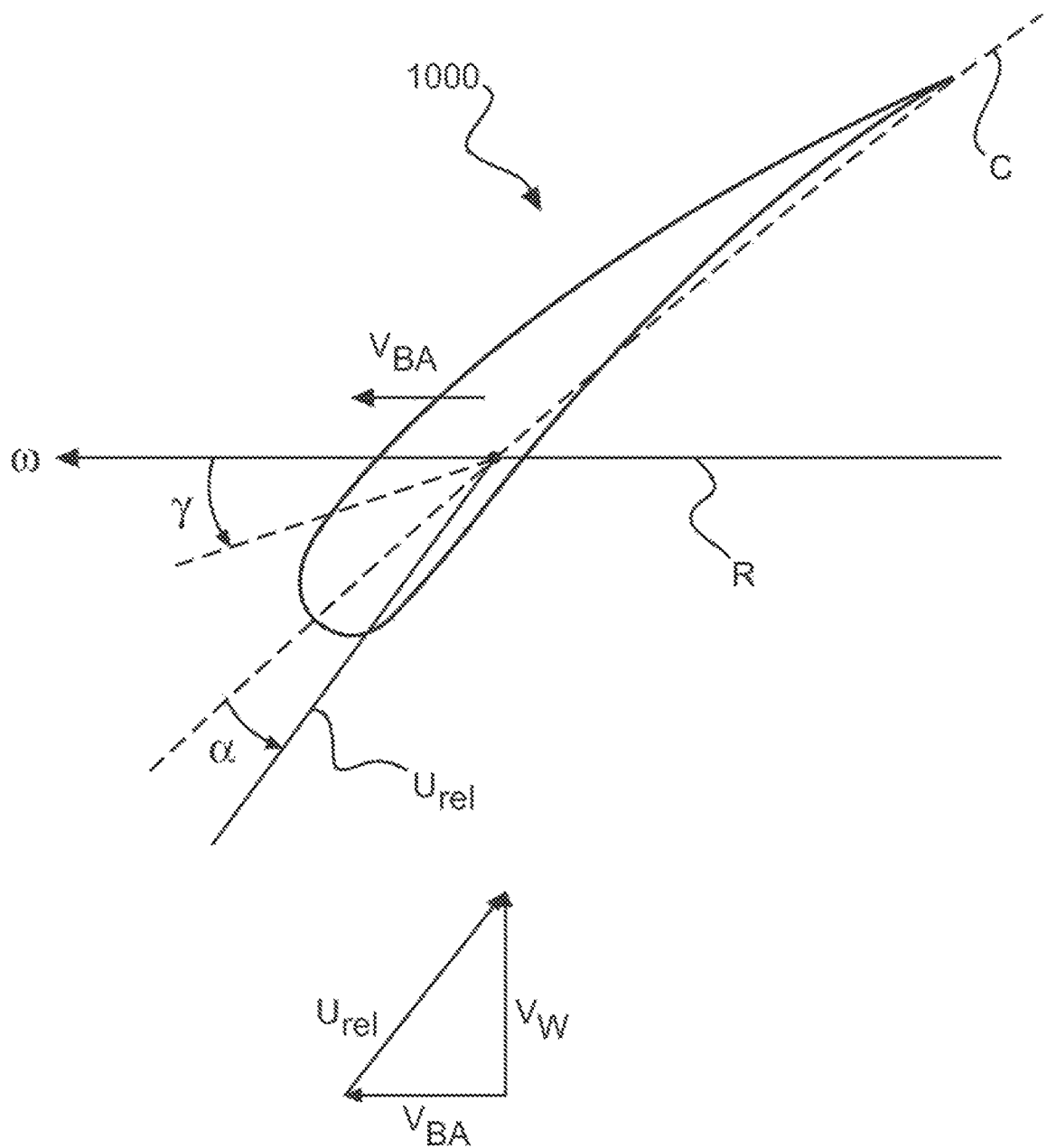
FIG. 10 illustrates the importance of the blade angle and the angle of attack.

To illustrate the blade angle γ and the angle of attack α, these are shown in FIG. 10 for a profile section 1000. This profile section 1000 thus stands for a rotor blade section. Turning the rotor blade in rotor plane R at rotational speed ω results in a blade section velocity $V_{BA}$ for profile section 1000 under consideration, said velocity thus being parallel to the rotor plane. The true wind speed $V_W$ results in an apparent or relative wind speed $U_{rel}$ when the blade section velocity $V_{BA}$ is taken into account. This is shown as a schematic vector diagram inserted into FIG. 10. Only the relative wind direction $U_{rel}$ is indicated on profile section 1000. The angle between this relative wind direction $U_{rel}$ and chord c is the angle of attack α. It also depends directly on the set blade angle γ in relation to rotor plane R. A small blade angle γ corresponds to a setting in partial load mode.

In FIG. 4, it can be seen that positive angles of attack are found only in the inner part of the blade and that the value of the angle of attack decreases sharply towards the outside and becomes clearly negative towards the blade tip. It should be mentioned that the abscissa in FIG. 4 shows the respective position on the rotor blade in relation to the total length of the blade. At the blade tip, the position is therefore equal to the length of the rotor blade, so the value there is 1. The position is treated as a radius r of the rotor in relation to the total radius R of the rotor. The abscissa does not quite go to the value zero, because the value zero is located at the axis of rotation and therefore in the spinner or hub.

FIG. 4 shows only one example, but it was realized that the higher the wind speed and the less power the wind power plant feeds into the grid at these higher wind speeds in storm mode, the more pronounced this trend or phenomenon becomes. It was realized that this can be problematic, as at high negative angles of attack there is a risk that negative stall, i.e., stalling on the pressure side of the profile, can occur at the profiles where these high negative angles of attack arise. Depending on the profile and the structural design of the rotor blade, there may therefore be a risk of undesirable aeroelastic phenomena on the rotor blade due to operation in sections of the rotor blade with negative stall. This means that feedback may occur between the forces exerted by the flow of air around the rotor blade and the elastic deformations that arise as a result. Such deformations, in turn, can cause changes in the flow of air and changing forces due to aerodynamic factors.

It was also realized in this regard that such feedback can be manifested in a way that leads to oscillating motion about the longitudinal axis of the rotor blade. In that case, the rotor blade would therefore be subject to torsion with a high frequency and amplitude. Such rotor blade vibrations could even acquire amplitudes that can cause damage to the rotor blade. Preventive measures are therefore proposed. It was realized here, in particular, that such stalling can occur when a wind power plant is in storm mode and negative angles of attack occur at the rotor blade. It is proposed, accordingly, that this phenomenon in particular, i.e., such negative angles of attack, be counteracted and prevented as far as possible.

FIG. 4 thus shows the angle of attack α over the length of a rotor blade having a total length R, wherein the maximum radius of the rotor in which the rotor blade is operated is actually used as the total length R, so the maximum radius R indicates the value from the rotational axis of the rotor to the tip of the blade. The radius r under consideration is normalized to this maximum radius R, so the abscissa extends to the value of 1.

It can be seen that this angle of attack curve 402 takes negative values from about half way along the rotor blade, i.e., from about the value 0.5 for the radial position on the rotor blade, and that the magnitude of those negative values becomes even greater towards the blade tip, i.e., are even further below zero. This is an example of a rotor blade whose blade angle has been adjusted too much in storm mode in order to reduce the rotational speed too strongly as a result. If the blade angle were adjusted less, with the rotational speed being reduced less or later, the angle of attack would not turn negative so strongly, or indeed not at all.

Based on this finding, the object to be achieved for the storm mode of a wind power plant is to prevent the occurrence of stalling when the rotor blade has negative angles of attack.

To achieve this, it is therefore proposed that operation during a storm be adjusted accordingly. It is proposed, in particular, that the operating characteristic curve or the wind speed/rotational speed characteristic curve, or both characteristic curves simultaneously, be modified in comparison with the variants used hitherto. The proposed improvements or options for improvement are illustrated in the following FIGS. 5 to 7, in particular.

Figure 5:
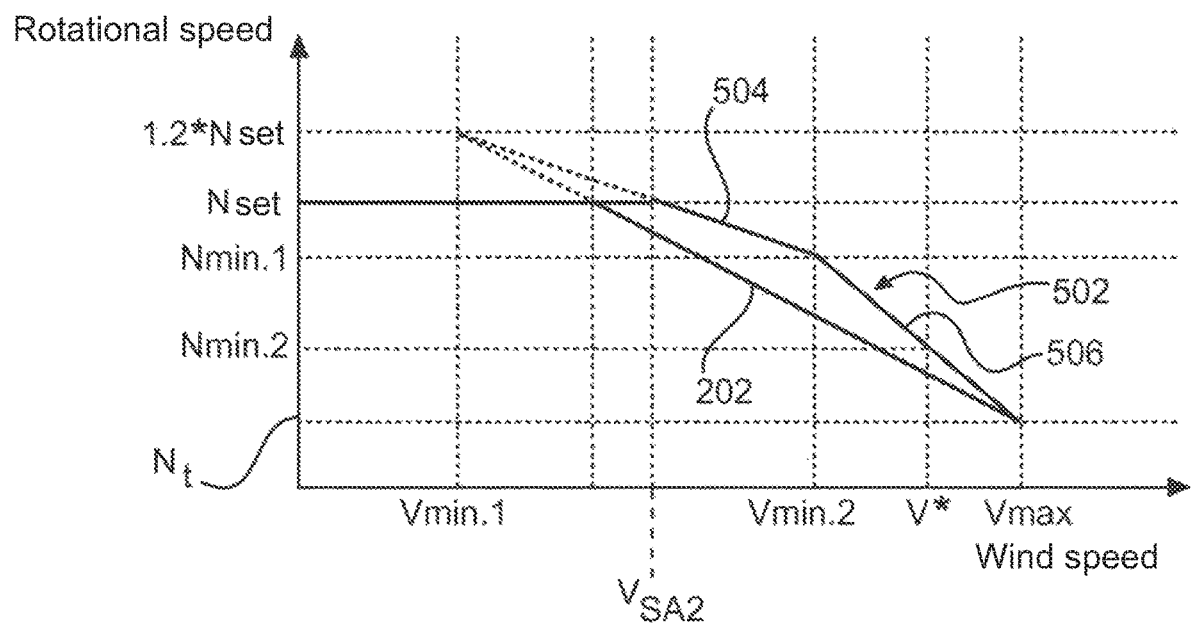
FIG. 5 shows an improved wind speed/rotational speed characteristic curve.

FIG. 5 shows, inter alia, the wind speed/rotational speed characteristic curve 202 of FIG. 2. It is now proposed, specifically, to deviate from this wind speed/rotational speed characteristic curve 202, and to that end an improved wind speed/rotational speed characteristic curve 502 is proposed. This improved wind speed/rotational speed characteristic curve 502 does not start to reduce the rotational speed until a higher storm commencement wind speed $V_{SA2}$ is reached. From there, the rotational speed decreases with a smaller initial speed gradient until the second minimum wind speed $V_{min2}$, where it reaches the first minimum rotational speed $N_{min1}$. From there, the improved wind speed/rotational speed characteristic curve 502 drops with a gradient of increased magnitude to idle speed $N_t$ at maximum wind speed $V_{max}$. In this way, it is possible for this improved wind speed/rotational speed characteristic curve 502 to lie above wind speed/rotational speed characteristic curve 202. The first minimum rotational speed $N_{min1}$ may also constitute an intermediate storm rotational speed or a storm auxiliary rotational speed, which may also be equal in value to a storm auxiliary rotational speed that is used in an operating characteristic curve described further below. This improved wind speed/rotational speed characteristic curve 502 thus reduces the rotational speed comparatively late and also reduces it comparatively little, at lest initially. It is not until later, namely from the second minimum wind speed $V_{min2}$ or when the first minimum rotational speed $N_{min1}$ is reached, that the rotational speed then drops steeply.

Shutdown of the wind power plant when the 10-minute average wind speed is above the safety wind speed V* can also be carried out at a higher rotational speed, namely the second minimum rotational speed $N_{min2}$.

The aim of the proposal according to the improved wind speed/rotational speed characteristic curve 502 is to raise the rotational speed in storm mode, compared to previous approaches. In other words, the rotational speeds are to be reduced later and/or less with increasing wind speed, at least at the beginning of storm mode. The cut-out wind speed, which can also be referred to as the maximum wind speed $V_{max}$, remains the same, and a linear relationship between the wind speed and the rotational speed can also be used, according to one embodiment at least. However, it is proposed that the relationships be specified linearly here in sections, in particular in two sections, of which the first, i.e., the one for lower wind speeds, is flatter, and the second, later one, i.e., the one used at higher wind speeds, is steeper.

Such first and second sections 504, 506 are shown in FIG. 5. It is therefore proposed as an improvement that the commencement of the storm mode is postponed from the storm commencement wind speed to a higher storm commencement wind speed $V_{SA2}$. A characteristic curve with linear sections of different gradients is also proposed with the aim of increasing the rotational speeds throughout the entire storm mode in comparison with the variant shown in FIG. 2.

Figure 6:
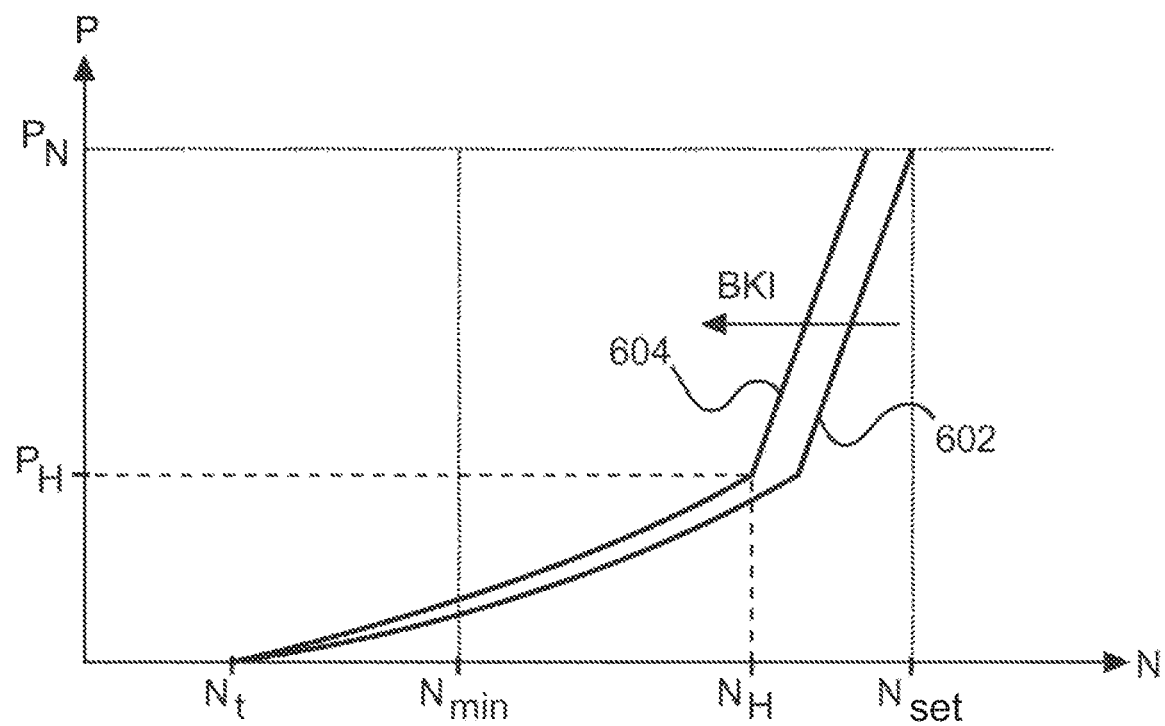
FIG. 6 shows a proposed operating characteristic curve.
Figure 7:
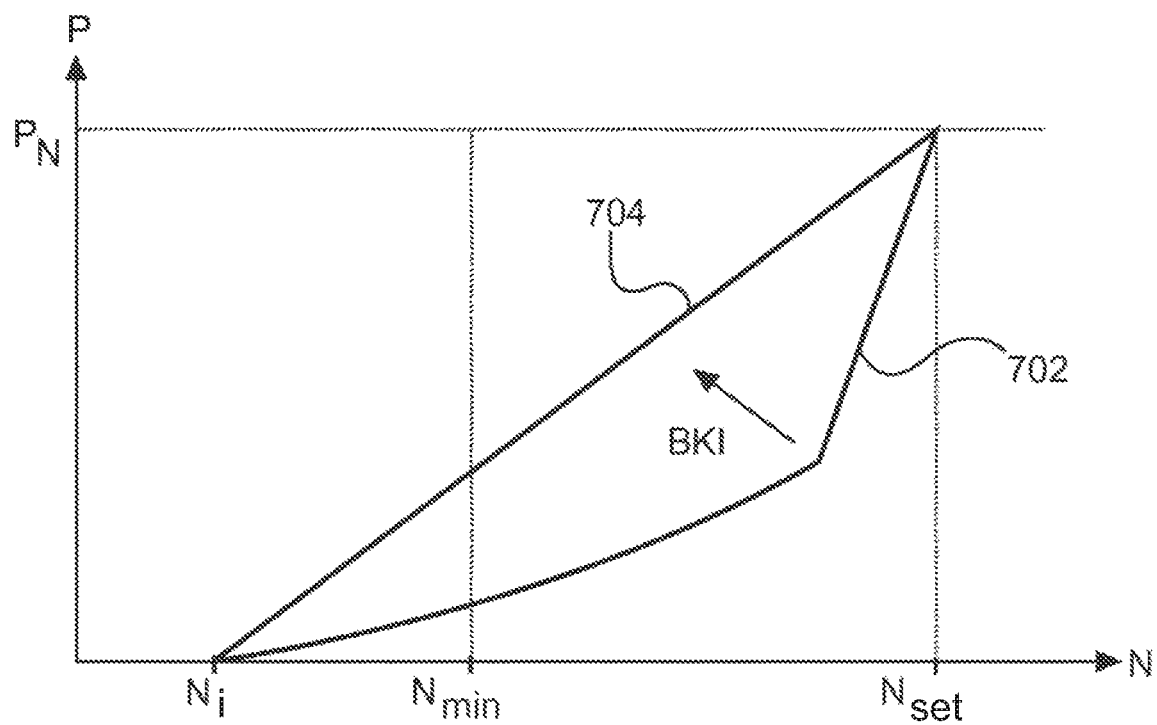
FIG. 7 shows another proposed operating characteristic curve.

To that end, preferably adapted operating characteristic curves as shown in FIGS. 6 and 7 are also proposed. The aim of these modifications of the operating characteristic curves is to increase the power at a given rotational speed. One way of achieving this is to shift an operating characteristic curve as shown by way of illustration in FIG. 6. By way of comparison, and as indicated by an arrow, a first operating characteristic curve, which can also be referred to as a normal operating characteristic curve 602, is shown there which can basically be moved to the left to the improved operating characteristic curve 604. This shift means in effect that the power P has the same gradients as before, only at a lower rotational speed in each case. The power output for a given rotational speed is thus increased. Due to the shift, however, the nominal power $P_N$ is also maintained even when the rotational speed is slightly lower.

As far as the specific gradients of the operating characteristic curve are concerned, the improved operating characteristic curve 604, which forms a storm mode characteristic curve here, decreases initially, with increasing wind speed $V_W$, from the predefined storm commencement power value $P_N$ at the predefined storm commencement rotational speed $N_{set}$ to a storm auxiliary power value $P_H$ at a predefined storm auxiliary rotational speed $N_H$, and from there to the final storm power value, namely zero, at the predefined final storm rotational speed $N_r$.

In another embodiment, a linear relationship between power and rotational speed may be provided from the nominal speed $N_{set}$ to the idle speed $N_r$. This is illustrated in FIG. 7, which also shows by way of comparison a normal operating characteristic curve 702 which is not a straight line, i.e., which does not define a linear relationship between power and rotational speed. As indicated by the arrow, this normal operating characteristic curve 702 is modified to obtain the improved linear operating characteristic curve 704. It was also realized here, in particular, that such a linear relationship for an operating characteristic curve is suitable for the storm mode, but is less suitable for the partial load mode.

It partial load mode, it makes particular sense for aerodynamic reasons to initially increase the rotational speeds as quickly as possible with increasing wind, because at low wind speeds this can result in aerodynamically favorable tip speed ratios. However, it was realized that it may make sense in storm mode not to reduce the power too much when the wind is increasing and the rotational speed is reduced. In storm mode, potential aspects of the wind power plant stalling do not play a role, either, so the power can be kept relatively high there on the operating characteristic curve. That is precisely what can be achieved by the improved linear operating characteristic curve 704 being proposed. In addition, a relative high power output can nevertheless be generated despite reducing the rotational speed and power in storm mode in order to protect the wind power plant. The improved linear operating characteristic curve 704 being proposed can provide such an advantage.

It was realized at the same time that when characteristics of the generator being used are taken into account, in particular its maximum, speed-dependent power output, it is nevertheless possible to generate a relative high power output.

Figure 8:
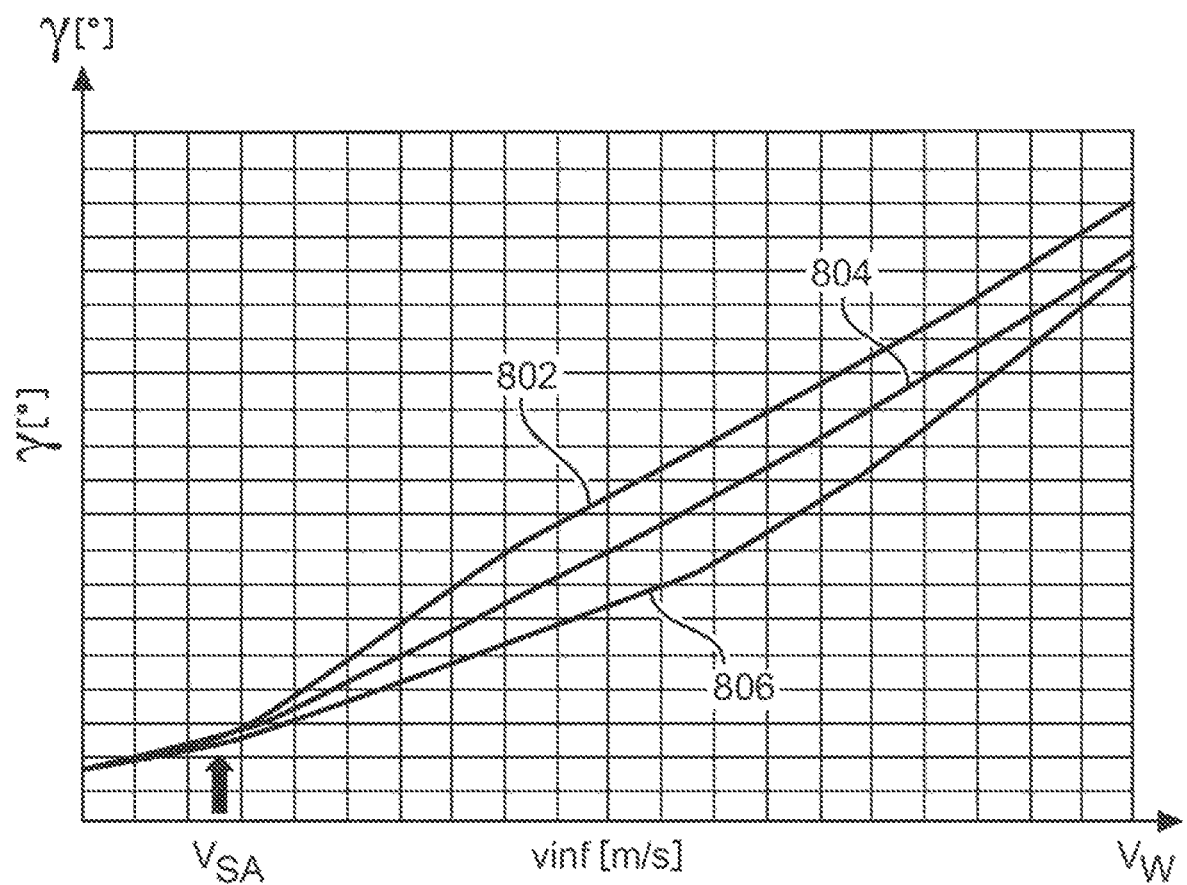
FIG. 8 compares different blade angles as a function of wind speed, for different embodiments.
Figure 9:
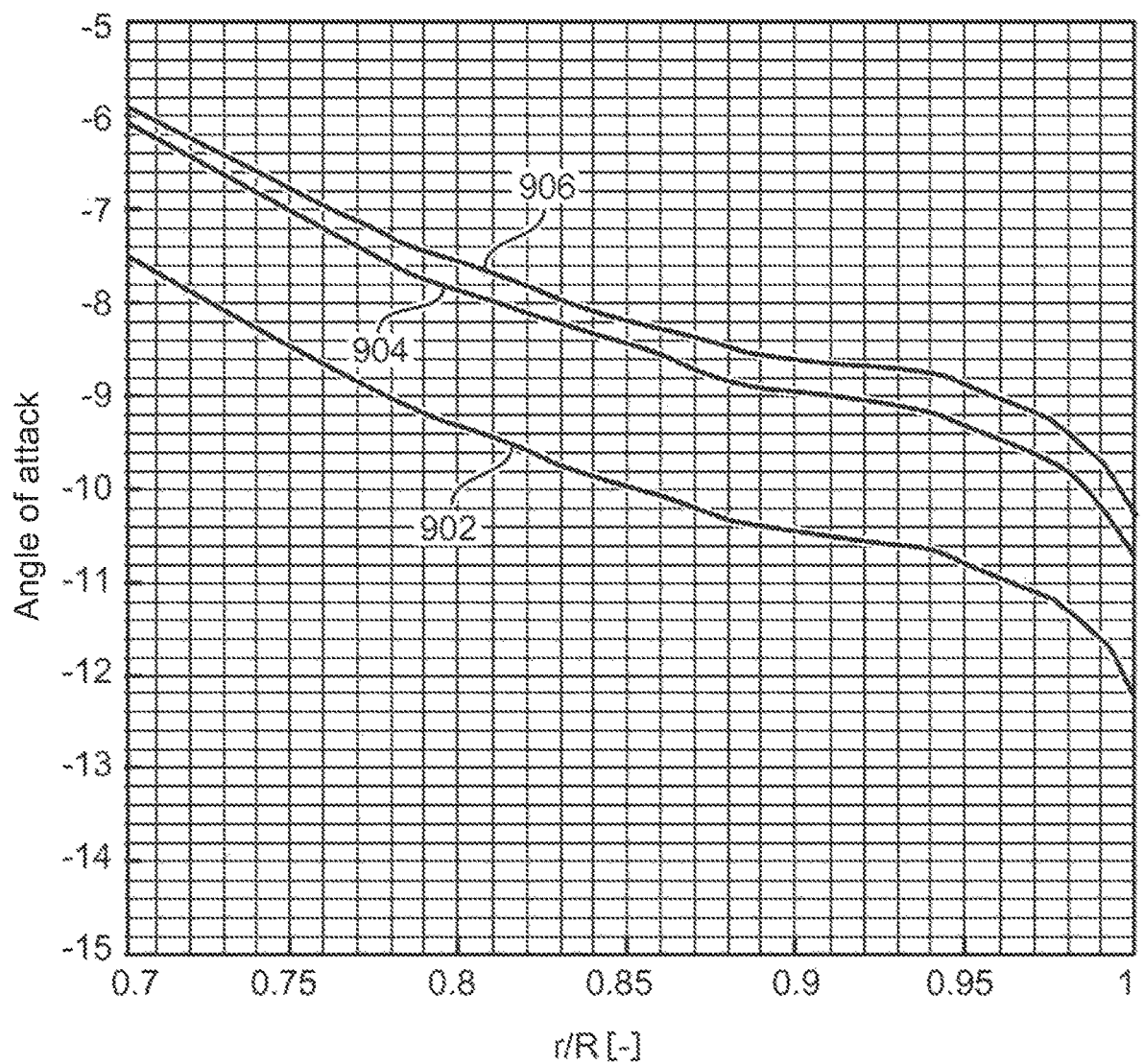
FIG. 9 shows different angles of attack in an outer region of a rotor blade, for different embodiments.

Achievable effects are shown in FIGS. 8 and 9. FIG. 8 illustrates for three different cases how the blade angle $\gamma$ changes as a function of wind speed $V_w$ in storm mode. FIG. 8 thus shows three different blade angle curves 802, 804 and 806. The first blade angle curve 802 can also be referred to as a normal blade angle curve and basically belongs to the wind speed/rotational speed characteristic curve 202 in FIG. 2. At the same time, an operating characteristic curve according to the normal operating characteristic curve 602 or 702 of FIG. 6 or 7, respectively, is used as a basis.

A second and thus improved blade angle curve 804, likewise based on the wind speed/rotational speed characteristic curve 202 in FIG. 2, is also shown, but for which an improved operating characteristic curve was used. An improved operating characteristic curve 604 or 704, or similar, may have been used in this regard. The third, further improved blade angle curve 806, is also based, in comparison with the second improved blade angle curve 804, on the improved wind speed/rotational speed characteristic curve 502, rather than wind speed/rotational speed characteristic curve 202.

In FIG. 8, it can be seen in particular that blade angles are smaller due to an improved operating characteristic curve being used and in addition due an improved wind speed/rotational speed characteristic curve being used. At the beginning of the storm mode, i.e., at storm commencement wind speed $V_{SA}$, the blade angles are also the same and then increase to different extents as the wind speed increases. As a result of the proposed measures, individually and also in combination, it is possible to reduce the blade angle in storm mode compared to variants in which such an improved operating characteristic curve and/or an improved wind speed/rotational speed characteristic curve is not used.

One particular reason for this is that the proposed measures basically lead to an increase in power compared to variants in which these measures are not performed, i.e., to generation of an increased output power that is also fed into the electrical supply grid. More power is thus extracted from the wind, and the wind power plant is curtailed to a lesser extent as a result. This is expressed in reduced blade angles, which can also be referred to as pitch angles or rotor blade angles. Smaller rotor blade angles also result directly in bigger angles of attack. This was realized, and it was also realized that this is an advantageous effect for preventing very small angles of attack and the risk of flow separation.

This is shown in FIG. 9. FIG. 9 shows, for the three blade angle curves 802, 804 and 806 and one wind speed, how the angle of attack changes in the outer region of the rotor blade, namely at a radius r of 70% to 100% in relation to the maximum radius R. FIG. 9 shows the angle of attack curves 902, 904 and 906 corresponding to blade angle curves 802, 804 and 806, respectively. Thus, FIG. 9 also shows the distribution of the angle of attack at the blade tip region that results from the types of operational management mentioned in connection with FIG. 8.

For example, if the rotor blade design used profiles for the 0.96<r/R<1 region, where there is a tendency to stall at angles of attack less than −11°, thus triggering the aeroelastic problems mentioned above, it would also be possible with the proposed measures to prevent wind power plants from being operated in this angle of attack range with values less than −11° and thus to prevent potential vibration and associated damage to the rotor blades. FIG. 9 shows, namely, that only angle of attack curve 902, which results when operational management is unchanged, achieves a significantly lower angle of attack than angle of attack curves 904 and 906 according to the improved operational management.

Provided is increasing the angle of attack, especially in the blade tip region. In storm mode, negative angles of attack may arise in the blade tip region, i.e., the flow stagnation point then lies on the suction side of the profile. At high negative angles of attack, flow separation typically occurs on the pressure side. In certain circumstances, when operating the system with flow separation on the pressure side, also known by those skilled in the art as negative stall, the rotor blade may start to vibrate due to aeroelastic factors, which in turn can cause damage to the rotor blade. By modifying the operational management, the proposed invention aims to prevent critical negative angles of attack being reached in storm mode and thus to safeguard or at least improve the integrity of the rotor blade.

By means of the proposed measures, it is thus possible to reduce the load on the rotor blades when in storm mode, while simultaneously allowing a higher power yield.

The invention claimed is:

1. A method of controlling a wind power plant for generating electrical power from wind, comprising:
    controlling the wind power plant in a partial load mode when wind speed is below a nominal wind speed, wherein the wind power plant includes a rotor having rotor blades with rotor blade angles that are adjustable, and wherein the rotor is operable at a variable rotational speed;
    controlling the wind power plant in a storm mode when the wind speed is above a storm commencement wind speed, wherein an output power to be output by the wind power plant in the partial load mode and in the storm mode is adjusted according to an operating characteristic curve that specifies a relationship between the rotational speed and the output power;
    using a partial load characteristic curve as the operating characteristic curve for controlling the wind power plant in the partial load mode;
    using a storm mode characteristic curve as the operating characteristic curve for controlling the wind power plant in the storm mode;
    with increasing wind speed, increasing the rotor blade angles according to the wind speed to reduce the rotational speed; and
    reducing the output power according to the reduction in the rotational speed,
    wherein the increase of the rotor blade angles to reduce the output power forms an angle/power change coefficient, and the angle/power change coefficient increases in magnitude with increasing wind speed, and the angle/power change coefficient decreases from a first reversal wind speed in the storm mode and increases again from a second reversal wind speed that is greater than the first reversal wind speed,
    wherein the storm mode characteristic curve and the partial load characteristic curve are different, and
    wherein at least one of:
        the storm mode characteristic curve, compared with the partial load characteristic curve, has lower rotational speeds for the same output power in at least sections of the storm mode characteristic curve, or
        a wind speed/rotational speed characteristic curve specifies a reduction in the rotational speed with increasing wind speed from the storm commencement wind speed, wherein a level of the reduction in the rotational speed increases with the increasing wind speed.

2. The method according to claim 1, wherein the storm mode characteristic curve, compared with the partial load characteristic curve, has lower rotational speeds for the same output power over an entire range of the storm mode characteristic curve.

3. The method according to claim 1, comprising:
    selecting the storm commencement wind speed according to an expected stalling of the rotor blades.

4. The method according to claim 1, comprising:
    selecting the storm commencement wind speed according to a power coefficient of the rotor blades.

5. The method according to claim 4, wherein the wind power plant is configured in such that the power coefficient decreases with the increasing wind speed at least from the nominal wind speed.

6. The method according to claim 4, comprising:
    selecting the wind speed at which the power coefficient falls below a predefined storm threshold for the power coefficient as the storm commencement wind speed.

7. The method according to claim 1, wherein the storm mode characteristic curve is a linear storm mode characteristic curve and decreases with the increasing wind speed from a storm commencement power value at a storm commencement rotational speed linearly to a final storm power value at a predefined final storm rotational speed.

8. The method according to claim 1, comprising:
    measuring the wind speed; and
    in the storm mode from the storm commencement wind speed,
        adjusting the rotor blade angles according to the wind speed to reach a lower rotational speed; and
        setting the output power according to the storm mode characteristic curve depending on the rotational speed reached.

9. The method according to claim 1, comprising:
    adjusting the rotor blade angles in the storm mode from the storm commencement wind speed to cause a resulting rotational speed according to the wind speed/rotational speed characteristic curve.

10. The method according to claim 1, wherein
    the wind speed/rotational speed characteristic curve forms a linear wind speed/rotational speed characteristic curve which decreases linearly with the increasing wind speed from a storm commencement rotational speed at the storm commencement wind speed to a final storm rotational speed at a final storm wind speed.

11. The method according to claim 1, wherein the wind speed/rotational speed characteristic curve specifies, with the increasing wind speed, a reduction of the rotational speed from the storm commencement wind speed, wherein a measure of the reduction of the rotational speed increases with the increasing wind speed.

12. The method according to claim 1, comprising:
    with the increasing wind speed, increasing the rotor blade angles according to the wind speed towards a feathered position such that the rotor blade angles increase in order to reduce the rotational speed.

13. The method according to claim 1, wherein the storm mode characteristic curve initially decreases with the increasing wind speed, from a predefined storm commencement power value at a storm commencement rotational speed to a storm auxiliary power value at a storm auxiliary rotational speed and from the storm auxiliary power value to a final storm power value at a final storm rotational speed, wherein the storm auxiliary power value at the storm auxiliary rotational speed is below a linear operating characteristic curve, and the storm mode characteristic curve is flatter from the storm auxiliary rotational speed to the final storm rotational speed than from the storm commencement rotational speed to the storm auxiliary rotational speed.

14. The method according to claim 1, wherein the wind speed/rotational speed characteristic curve decreases initially with the increasing wind speed from a storm commencement rotational speed at the storm commencement wind speed to an intermediate storm rotational speed at an intermediate storm wind speed, wherein the intermediate storm rotational speed is the same as a storm auxiliary rotational speed, wherein the wind speed/rotational speed characteristic curve decreases from the intermediate storm rotational speed at the intermediate storm wind speed to a final storm rotational speed at a final storm wind speed.

15. The method according to claim 14, wherein the storm commencement rotational speed corresponds to a higher storm commencement wind speed than the storm commencement wind speed.

16. The method according to claim 14, wherein the intermediate storm rotational speed at the intermediate storm wind speed is above the wind speed/rotational speed characteristic curve that is linear.

17. The method according to claim 14, wherein the wind speed/rotational speed characteristic curve decreases from the intermediate storm wind speed to the final storm wind speed more steeply than from the storm commencement wind speed to the intermediate storm wind speed.

18. A wind power plant for generating electrical power from wind, comprising:
a rotor having rotor blades with adjustable rotor blade angles, wherein the rotor is operable at a variable rotational speed; and
a controller configured to:
control the wind power plant in a partial load mode when wind speed is below a nominal wind speed; and
control the wind power plant in a storm mode when the wind speed is above a storm commencement wind speed;
control the wind power plant such that an output power of the wind power plant in the partial load mode and in the storm mode is adjusted according to an operating characteristic curve, wherein the operating characteristic curve specifies a relationship between the rotational speed and the output power;
use a partial load characteristic curve as the operating characteristic curve for controlling the wind power plant in the partial load mode;
use a storm mode characteristic curve as the operating characteristic curve for controlling the wind power plant in the storm mode;
with increasing wind speed, cause the rotor blade angles to be increased according to the wind speed to reduce the rotational speed; and
cause the output power to be reduced according to the reduction in the rotational speed,
wherein the increase of the rotor blade angles to reduce the output power forms an angle/power change coefficient, and the angle/power change coefficient increases in magnitude with the increasing wind speed, and the angle/power change coefficient decreases from a first reversal wind speed in the storm mode and increases again from a second reversal wind speed that is greater than the first reversal wind speed,
wherein at least one of:
the storm mode characteristic curve and the partial load characteristic curve are different, and the storm mode characteristic curve, compared with the partial load characteristic curve, has lower rotational speeds for the same output power values in at least sections of the storm mode characteristic curve; or
the controller is configured to specify a wind speed/rotational speed characteristic curve which specifies a reduction in the rotational speed with the increasing wind speed from the storm commencement wind speed, wherein a level of reduction in the rotational speed increases with the increasing wind speed.

19. The wind power plant according to claim 18, comprising:
a wind speed sensor configured to record the wind speed, wherein the wind power plant is configured to use the wind speed recorded by the wind speed sensor as an input variable in order to adjust a rotor blade angle in the storm mode according to the wind speed in order to reduce the rotational speed of the rotor with the increasing wind speed.

* * * * *